United States Patent [19]

Meuleman

[11] Patent Number: 4,543,990

[45] Date of Patent: Oct. 1, 1985

[54] IRRIGATION VALVE

[75] Inventor: Guy A. Meuleman, Rupert, Id.

[73] Assignee: Aqua Control, Inc., Rupert, Id.

[21] Appl. No.: 511,657

[22] Filed: Jul. 5, 1983

[51] Int. Cl.[4] .............................................. F16K 37/00
[52] U.S. Cl. .................................... 137/556; 137/883;
  137/537; 239/272; 251/145; 251/352; 285/162
[58] Field of Search ....................... 137/556, 883, 537;
  251/145, 146, 352; 285/162, 188; 16/2;
  239/272, 542, 551

[56] References Cited

U.S. PATENT DOCUMENTS

| | | | |
|---|---|---|---|
| 1,043,118 | 11/1912 | Linxweiler | 137/883 |
| 1,755,104 | 4/1930 | Deierlein | 285/208 |
| 1,786,963 | 12/1930 | Schoenberger | 137/883 |
| 2,925,991 | 2/1960 | Hempel | 251/352 |
| 3,033,514 | 5/1962 | Grosch | 251/145 |
| 3,372,441 | 3/1968 | Fisher | 16/2 |
| 3,746,263 | 7/1973 | Reeder et al. | 239/542 |
| 3,776,463 | 12/1973 | Dyck | 239/204 |
| 3,819,118 | 6/1974 | Brock et al. | 285/162 |
| 3,841,349 | 10/1974 | Todd | 239/542 |
| 3,842,859 | 10/1974 | Reinke | 137/504 |
| 3,880,189 | 4/1975 | Bennett | 137/608 |
| 3,885,743 | 5/1975 | Walce | 239/272 |
| 3,973,732 | 12/1976 | Diggs | 239/271 |
| 4,157,281 | 6/1979 | Burkhardt et al. | 137/537 |
| 4,207,921 | 6/1980 | Sloon | 285/162 |

OTHER PUBLICATIONS

Brochure, #EMD-032, 7/82, entitled "Cablegation" published by Idaho Power and others, (1982).
Gifford-Hill brochure, "Introducing Water Gate", TP-B15, (1979).

Primary Examiner—A. Michael Chambers
Attorney, Agent, or Firm—Walter C. Farley

[57] ABSTRACT

A valve is mountable in an opening in a gated pipe to control water flow, particularly in a cablegation system. A gasket is mountable in the irrigation pipe opening and a hollow leg of a T-shaped valve housing is inserted into the mounting member. The housing has a hollow, open-ended tubular portion which receives a hollow valve member. The valve member has an enlarged cap and a side opening alignable with the housing leg, the degree of alignment controlling the amount of flow. The valve member can also include a check valve.

17 Claims, 20 Drawing Figures

IRRIGATION VALVE

This invention relates to improved valves for use in irrigation systems which employ gated pipe.

BACKGROUND OF THE INVENTION

It is known to irrigate fields by laying pipe across the ends of irrigation furrows or ditches, providing openings along a side of the pipe and then filling or partially filling the ipe with water. As the water reaches the level of the openings, it flows out of the holes and into the ditches. This is called gated irrigation pipe.

It is also known to provide valves at the openings which can be adjusted individually to control the flow from each of the openings. This permits control of the flow to adapt the system to varying lengths of the irrigation ditches, changes in elevation of the gated pipe and other variables.

A further development is called "cablegation" in which the pipe is inclined and a plug is passed through the pipe, restrained by a cable and followed by water. By regulating the rate at which the cable is payed out, the speed of the plug is controlled. This controls the length of time the body of water is high enough to reach the openings and, thereby, the amount of water dispensed through each opening.

Examples of irrigation systems in this general category and of valves and couplings usable therein are shown in the following U.S. Pat. Nos.:

| | |
|---|---|
| 1,043,118 | Linxweiler |
| 1,755,104 | Deierlein |
| 1,786,963 | Schoenberger |
| 3,033,514 | Grosch |
| 3,746,263 | Reeder et al |
| 3,776,463 | Dyck |
| 3,842,859 | Reinke |
| 3,880,189 | Bennett |
| 3,973,732 | Diggs |

As will be recognized, it is necessary to adjust the valves from time to time, especially when the system is newly installed but also thereafter as conditions change. It is particularly important to be able to adjust such valves when used in a cablegation system because of the significantly greater potential for water waste by over irrigation or, alternatively, for insufficient irrigation. Thus, it is important that they be easily adjustable and that they remain in the adjusted position despite the influences of wind, surges of water and the activities of small birds and animals. Unfortunately, the valves of the prior art do not satisfy all of those requirements. Some are adjustable only with some difficulty, requiring that a lock nut or screw be loosened to move a valve member. Those which are easily adjustable are also easily movable by, e.g., a field mouse seeking water. Furthermore, valves previously available are not calibrated and, in operation, deliver different flows even in gates which are side-by-side. It is also quite important to be able to control the erosion which can occur as the result of excessive pressure in a stream directed toward the earth.

BRIEF SUMMARY OF THE INVENTION

Accordingly, it is an object of the present invention to provide a valve usable in gated pipe which permits free flow of water at a rate which is easily and quickly adjustable and wherein the valve remains in the adjusted position.

A further object is to provide a valve which can be inexpensively molded from polymeric materials and readily attached to existing gated pipe to permit economic regulation of water flow but which exhibits minimum leakage at average or high pressures.

A further object is to provide a valve which dissipates the energy in the flowing water and thereby minimizes erosion at the area of the base of the pipe without unnecessarily impeding water flow.

A still further object is to provide such a valve which is sturdy and reliable.

Briefly described, the invention includes a valve for regulating the flow of liquid through an opening in the side of a generally horizontal pipe comprising a mounting adapter insertable through the opening in the pipe, said adapter having a portion outside of the pipe in its mounted position for receiving a valve housing and having a central opening alignable with the opening through the pipe; a generally T-shaped valve housing having a hollow leg with means thereon for engaging said adapter, the cross arms of said housing comprising a hollow, tubular member open at both ends, said adapter and housing being mountable in the pipe opening such that said arms of said housing lie in a generally vertical plane with one arm higher than the other; and a tubular, hollow valve member slidably received in the arms of said housing, said valve member having an enlarged portion at the higher end to limit the insertion of said member into said housing, and means defining a flow opening through the side wall thereof, said opening being axially spaced from said enlarged portion so as to lie in the same plane as said hollow leg, said valve member being selectively rotatable to a plurality of positions in which the opening in said valve member is completely aligned, partially aligned and totally non-aligned with said hollow leg and the opening in said pipe to thereby select the size of passage available for liquid flow.

In order that the manner in which the foregoing and other objects are attained in accordance with the invention can be understood in detail, certain advantageous embodiments thereof will be described with reference to the accompanying drawings, which form a part of this specification and wherein:

DETAILED DESCRIPTION OF PREFERRED EMBODIMENTS

Figure 1:
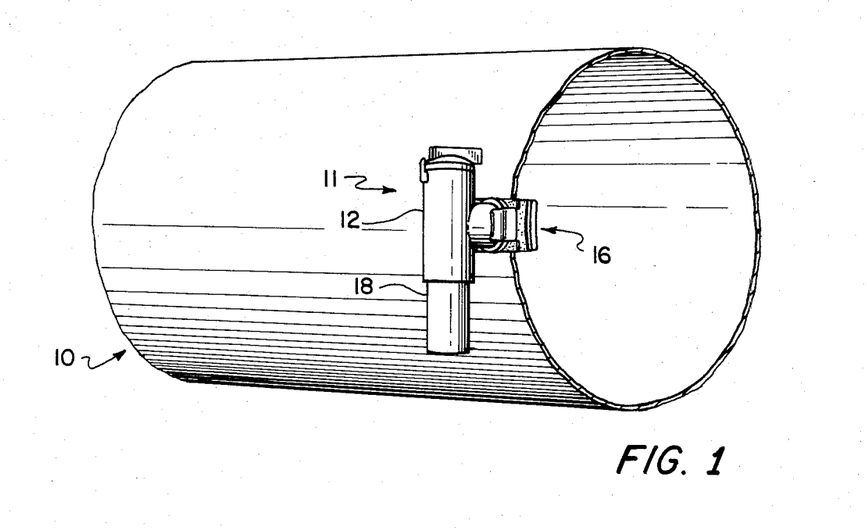
FIG. 1 is a partial perspective view of an irrigation pipe with a valve according to the invention installed therein.

FIG. 1 illustrates the environment in which the invention is used and shows a typical irrigation pipe indicated generally at 10 having mounted thereon a valve 11 in accordance with the present invention. The valve illustrated in FIG. 1 is shown in somewhat greater detail in FIGS. 2 and 3 and will be seen to include a valve housing 12 which is generally T-shaped having a leg 14 which is coupled to a mounting adapter 16. The transverse arms of the T comprise a hollow, tubular, open-ended member which receives a tubular valve member 18. At the upper end of valve member 18 is an enlarged cap 20 which limits the extent of insertion of the valve member into the arms of the T-shaped housing 12.

Referring again to FIG. 1, it will be recognized that the irrigation pipe is normally placed in a generally horizontal orientation which is intended to include a slight inclination as may be employed in connection with a cablegation system. In either case, as water is admitted to the upstream end of the pipe, it flows along the pipe and tends to fill the pipe, ultimately reaching the level of the valve assembly. The amount of the water in the pipe can be controlled to a degree, particularly with the cablegation system, but the flow through the individual orifices along the pipe can be controlled by the valve itself. Normally, the openings in the irrigation pipe are elongated and rectangular, as illustrated in FIG. 1, although they can also be rounded at one end, and the pipe is positioned with the openings at or above horizontal. The usual arrangement is one in wich the openings are about 30° above horizontal in a cablegation system.

Figure 2:
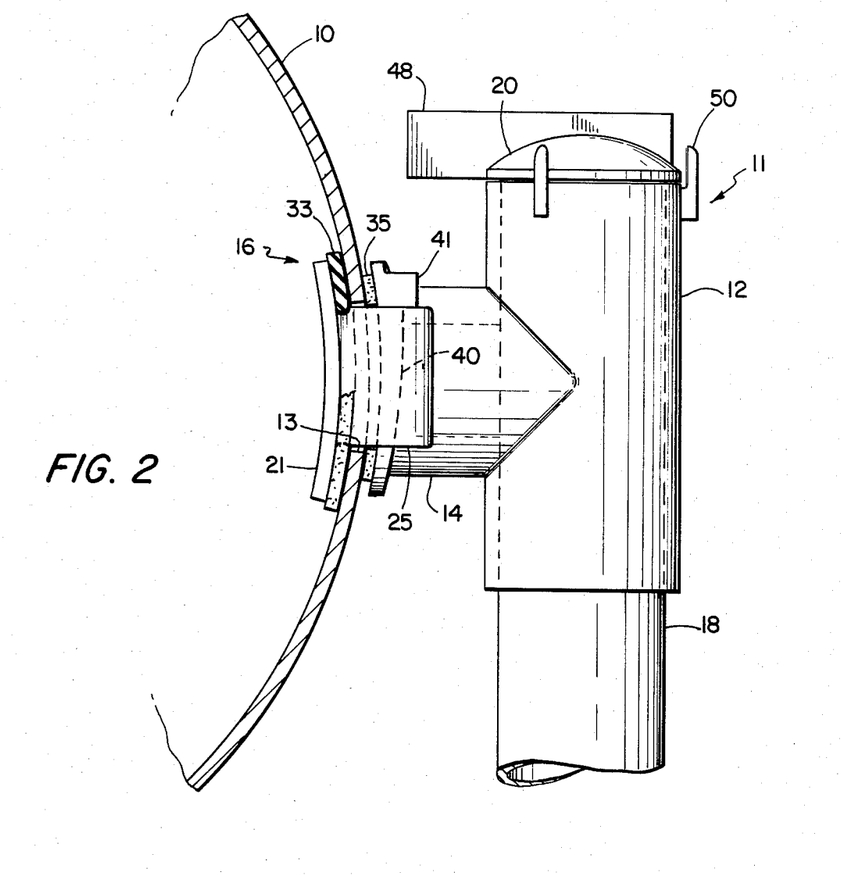
FIG. 2 is a side elevation of an installed valve with a partial view of the pipe.
Figure 3:
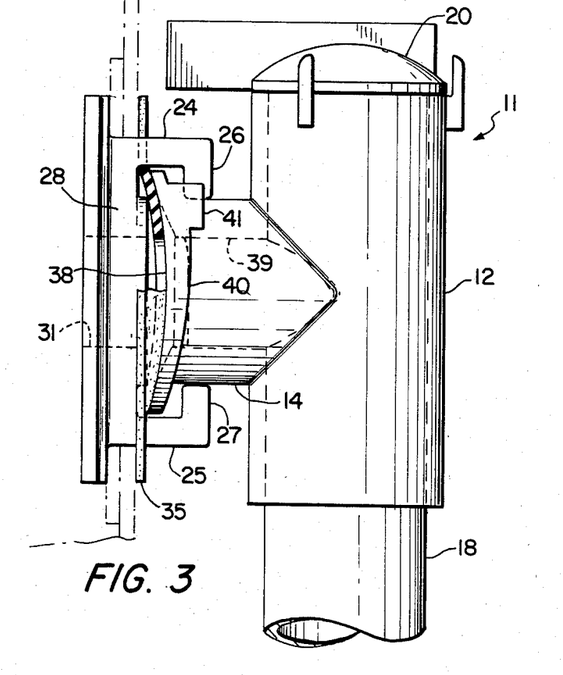
FIG. 3 is a top plan view of a valve mounting bracket with a valve assembly partially installed thereon.
Figure 5:
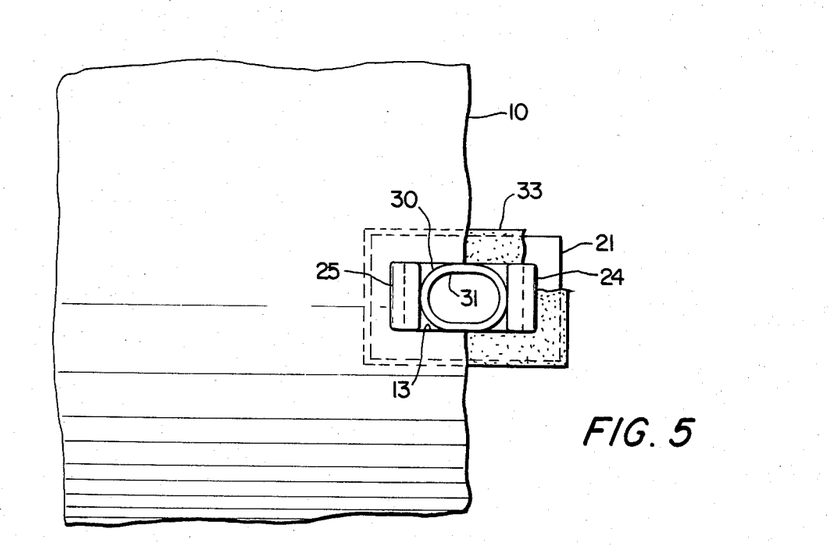
FIG. 5 is a front elevation, partially cutaway, of a valve mounting bracket and gaskets ready to receive a valve housing.

Because of the fact that the valves are frequently to be installed in pipe which is already in existence and in position, it is desirable to be able to install the valves entirely from outside of the pipe without having to separate sections of pipe for interior access. The mounting bracket 16 shown in FIGS. 2 and 3 is suitable for this purpose and includes an interior plate 21 which is generally rectangular and, as best seen in FIG. 2, has a slight curvature which approximately matches the interior of the pipe. Spaced inwardly from opposite ends of the plate are legs 24 and 25 which are generally L-shaped, having inwardly extending end portions 26 and 27 which extend toward each other. Thus, as seen in FIG. 3, viewing the mounting plate in plan as installed in the rectagular opening, the plate and the arms form a generally C-shaped opening. In addition, between the legs is a thicker portion 28 which protrudes through the pipe opening, the inner end thereof having an elongated boss 30 (FIG. 5) surrounding a central opening 31 through which fluid from the pipe interior can pass. A generally rectangular gasket 33 is positioned between plate 21 and the interior of the pipe to form a fluid seal. In addition, a second gasket 35 is positioned between the exterior of the pipe and the valve housing, gasket 35 having a central opening to surround opening 31.

As will be recognized, it is possible to dimension plate 21 and legs 24 and 25 such that the entire mounting adapter can be inserted through the rectangular pipe opening 13 and maneuver it such that the plate is inside the opening and legs 24, 25 protrude therethrough. Gasket 33 is inserted through the opening with plate 21. Thus, gasket 35 can be placed against the outside surface of the pipe and around opening 31, after which the valve housing can be attached thereto.

For purposes of illustrating the manner in which the valve housing is connected to the mounting bracket, FIG. 2 shows an end elevation of the pipe but a side elevation of the valve housing with the housing fixedly attached to the mounting bracket. FIG. 3 shows a top plan view of the pipe with the valve housing rotated approximately 90° in the clockwise direction, as viewed from the right, occupying an unlocked or partially assembled position.

Figure 4:
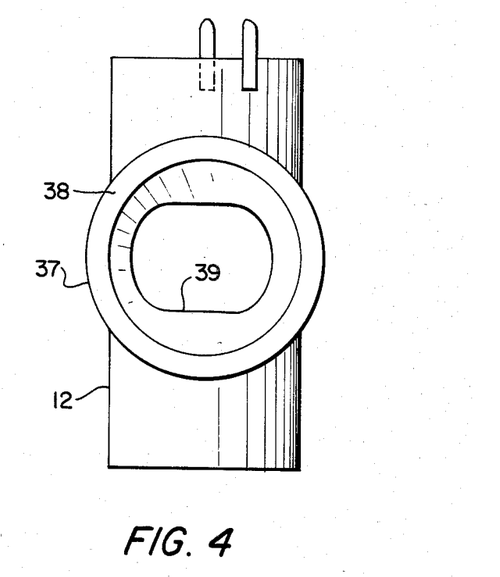
FIG. 4 is a rear elevation of a valve housing alone.

Leg 14 of valve housing 12 includes a radially outwardly protruding flange 37 which has a concave face 38 toward gasket 35. As seen in FIg. 4, leg 14 is hollow, having an interior opening 39. On the side of flange 37 facing toward the cross arms of the T-shaped housing, the flange is gradually thickened to form a cam surface 40 terminating at a stop member 41. As will be recognized from FIG. 3, the housing can be inserted between legs 24 and 25 from above when the axis of the cross arms of housing 12 is generally parallel with the axis of the irrigation pipe. Then, upon rotation of the housing in a counterclockwise direction, surface 40 engages the inwardly facing surface of leg portion 27, camming the concave surface 38 toward gasket 35 and pressing opening 39 against opening 31, gasket 35 forming a peripheral seal therebetween. This motion is limited by stop 41. On the other side of leg 14 is another camming surface of identical shape acting in conjunction with the inner surface of leg portion 36.

Figure 6:
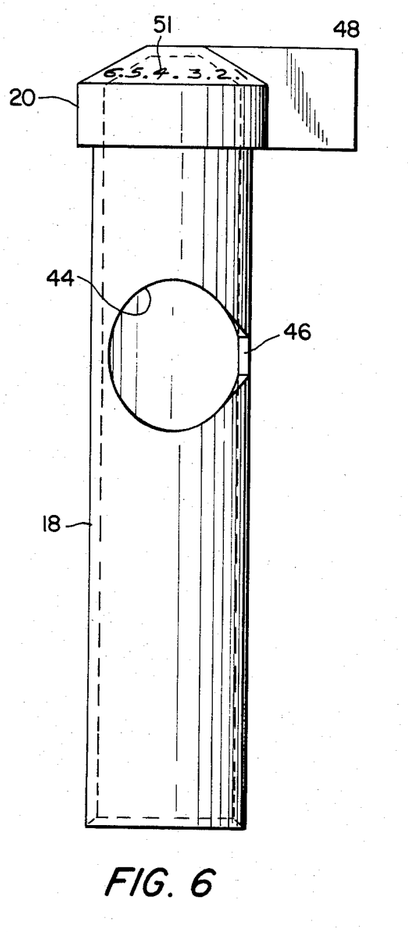
FIG. 6 is a side elevation of a valve member removed from the valve housing.

A valve member 18 is shown in FIG. 6 apart from the rest of the assembly. As will be seen, the valve member is an elongated, hollow tube having an enlarged head portion 20 to limit the insertion of the valve member into the housing. An opening 44 penetrates a side wall of the valve member, the opening being spaced from cap 20 by a distance equal to the spacing of passageway 39 in leg 14 from the upper end of housing 12. Thus, when the valve member is inserted into the housing, opening 44 can be positioned by rotating the valve member until the opening is fully aligned with passageway 39, partially aligned therewith or not aligned at all, thus permitting full, partial or no flow of water from within pipe 10 to the interior of valve member 18. When the openings are fully aligned, water flows freely through opening 44 and out of the open bottom end of valve member 18. In order to minimize leakage, valve member 18 is dimensioned to be rather tightly received within the valve housing but must be rotatable therein to adjust the extent of overlap of openings 39 and 44.

As will be seen in FIG. 6, opening 44 is not a circular opening. Rather, one side thereof is essentially circular but the other side tapers to a relatively short, flat side 46. This permits closer control of the flow at lower levels or at relatively high pressures.

For purposes of adjusting the degree of overlap of openings 39 and 44, cap 20 is provided with a radially extending wing or tab 48 which is fixedly attached, and preferably integrally formed, on cap 20. In addition, the exterior of housng 12 is provided with a fixed pointer 50 and the upper surface of cap 20 is provided with indicia 51, shown in the form of numerals indicating generally the degree of opening of the valve.

The arrangement of tab 48 permits quick and simple adjustment of the valve by moving the wing 48 until the valve is moved to the proper position as indicated by pointer 50 and numerals 51. There is no need to loosen or retighten lock nuts or to engage in any more complicated steps.

Figure 7:
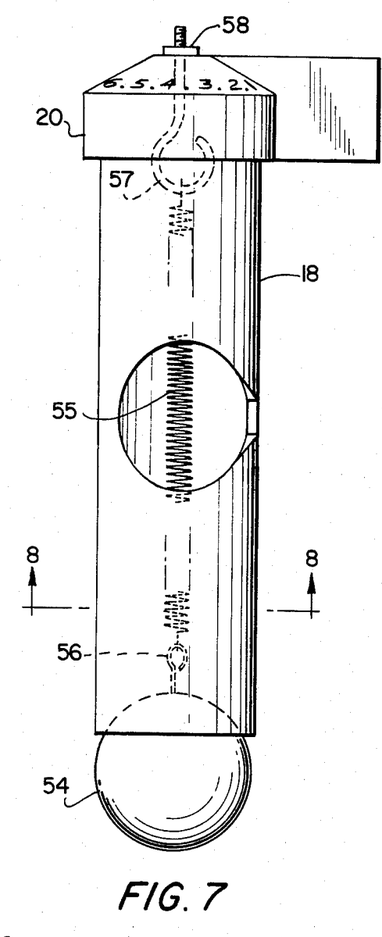
FIG. 7 is a side elevation of a further embodiment of a valve member usable with the housing of FIG. 4.

A further embodiment of a valve member is shown in FIG. 7, the valve member 18 being the same as previously described, but including a simple check valve comprising a ball 54 having a diameter larger than the inner diameter of valve member 18, and an extension coil spring 55, one end of which is attached to the ball by an eye 56 extending into or through the ball, the other end of spring 55 being anchored to an eye 57 which extends through the upper end of cap 20 and is secured by a nut 58. The length and strength of spring 55 are selected so that ball 54 is held against the chamfered inner end of member 18 when there is low or no fluid pressure acting against the ball from within the valve member. The prevents leakage at low head levels and also prevents the indress of small animals or the like. However, when a substantial amount of liquid pressure is present, the ball of pushed away from the opening and fluid can pass without difficulty. The ball can be a simple rubber ball of the kind commonly used as a toy.

Figure 9:
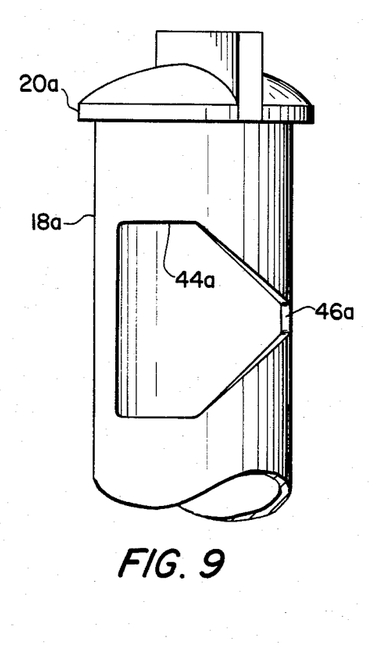
FIG. 9 is a partial side elevation of a further embodiment of a valve member in accordance with the invention.

As seen in FIG. 9, the opening through the valve member can take various shapes. As illustrated therein, a valve member 18a is provided with an opening 44a which has a straight, axially extending side and straight top and bottom sides, connecting with tapered sides linearly leading to a relatively short ball 46a. Shaping the opening in this fashion results in some manufacturing advantages.

Figure 10:
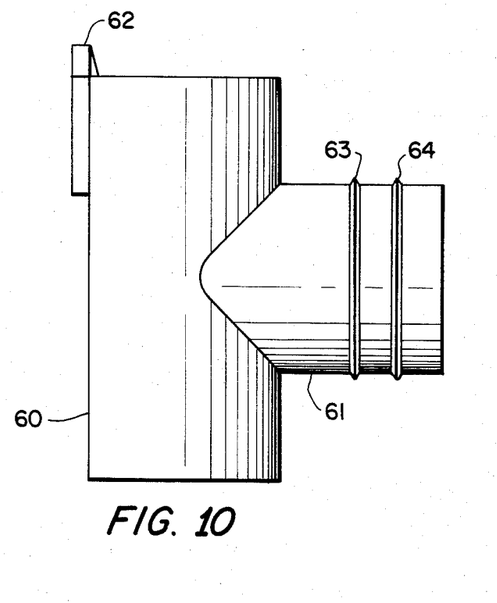
FIG. 10 is a side elevation of a further embodiment of a valve housing in accordance with the invention for use with round pipe openings.

FIG. 10 shows a further embodiment of a valve housing in accordance with the invention which is particularly useful with an adapter for mounting in circular openings in the side of an irrigation pipe. For the most part, the housing of FIG. 10 is generally similar to that described in connection with FIGS. 1-5 having a tubular arm portion 60 and a leg 61 which is to extend toward the pipe, portions 60 and 61 both being hollow and tubular. The upper end of portion 60 is provided with a pointer 62, portion 60 being intended to receive a valve member like those discussed above.

Portion 61 is provided with two annular, radially protruding ribs 63 and 64, each of which is triangular in cross section, the sides being at angles of approximately 60°.

Figure 11:
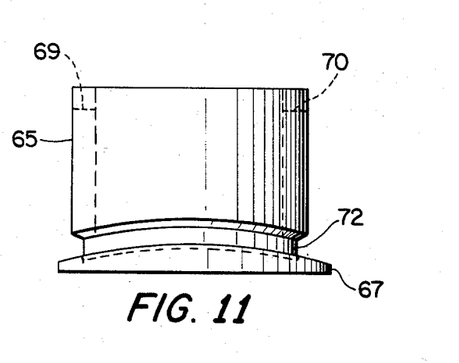
FIGS. 11, 12 and 13 are, respectively, front, side and end elevations of a mounting adapter for use with the valve housing of FIG. 10.
Figure 12:
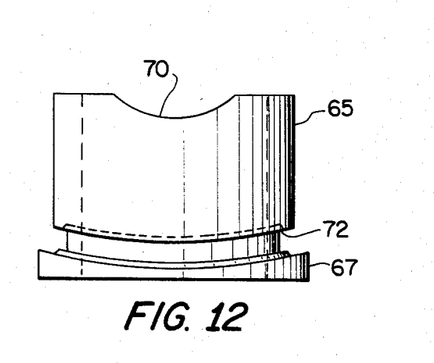
Figure 13:
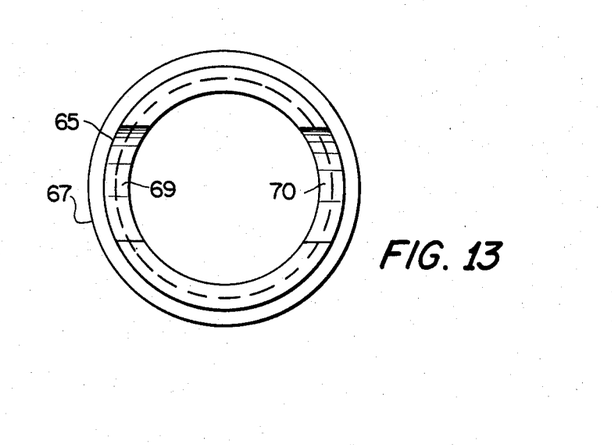

This housing is intended for use with a mounting adapter shown in FIGS. 11, 12 and 13, the adapter being a hollow cylindrical member 65 having a larger annular flange 67 at one end thereof. At the other end of body 65 are arcuate recesses 69 and 70. Adjacent flange 67 is an axially sinuous groove 72, the groove being convex in one direction as viewed from the side in FIG. 11 and convex in the other direction as viewed from the top as in FIG. 12.

The mounting adapter is inserted through a circular opening in an irrigation pipe from the inside, the opening being slightly larger than the outer diameter of body 65, and a locking member is then inserted in annular groove 72, the axial dimension of the groove being greater than the thickness of the pipe. After mounting this member, the valve housing is mounted thereon by inserting tubular leg 61 into body 65, the inner diameter of body 65 being slightly smaller than the outer diameter of annular ribs 63 and 64, thereby causing the ribs to deform, holding the housing in the mounting adapter and forming a fluid seal at the same time. Body 65 can be dimensioned to pass through a two inch hole or a 2.38 inch hole, two standard openings used in irrigation pipes.

Figure 14:
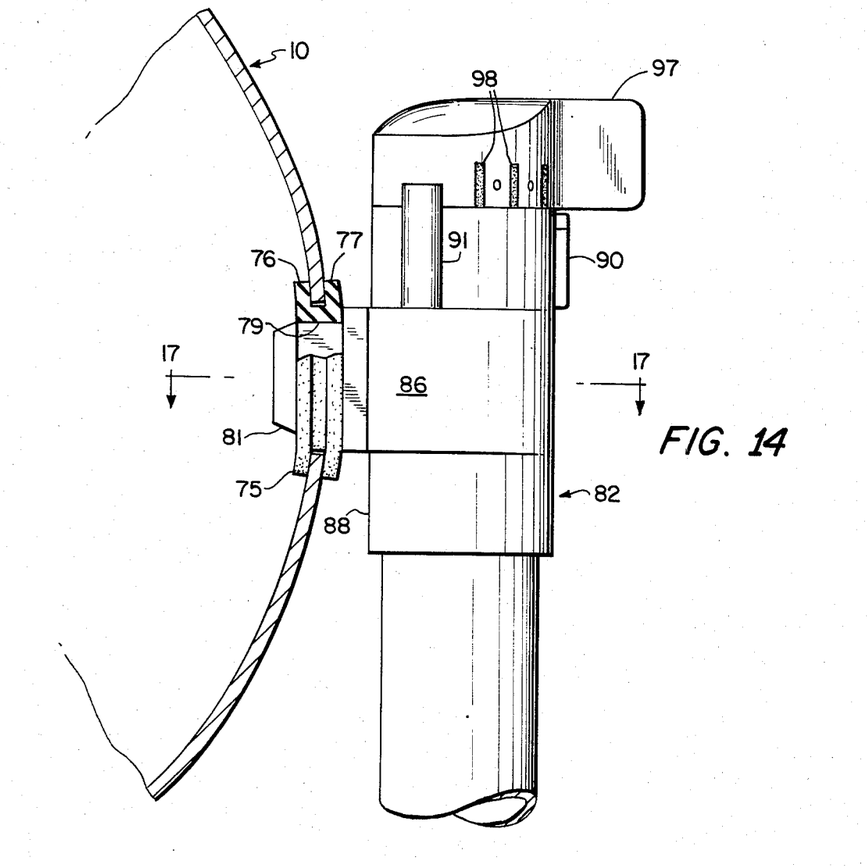
FIG. 14 is a left side elevation of a still further embodiment of a valve in accordance with the invention installed in a pipe.
Figure 15:
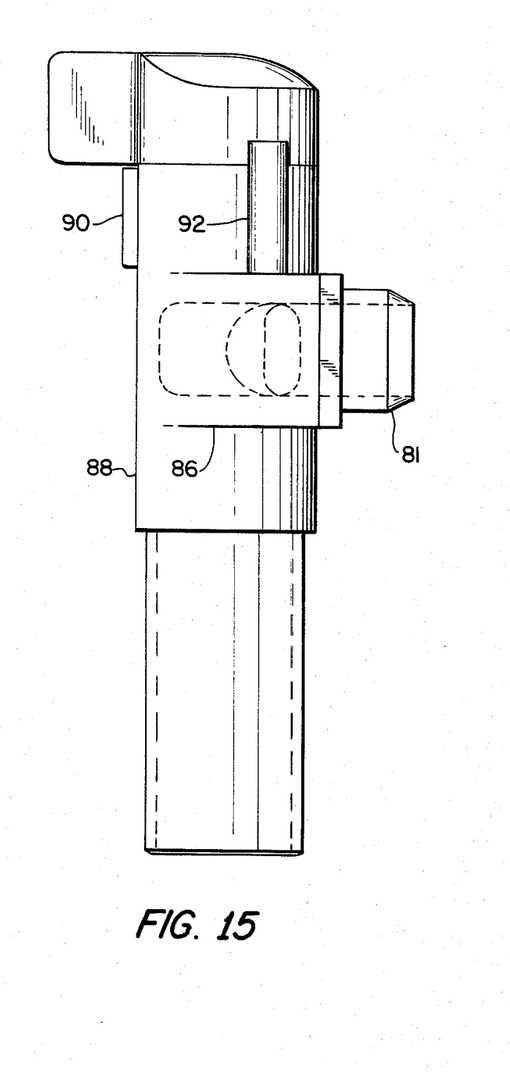
FIG. 15 is a right side elevation of the embodiment of FIG. 14 apart from the pipe and without the gasket.
Figure 16:
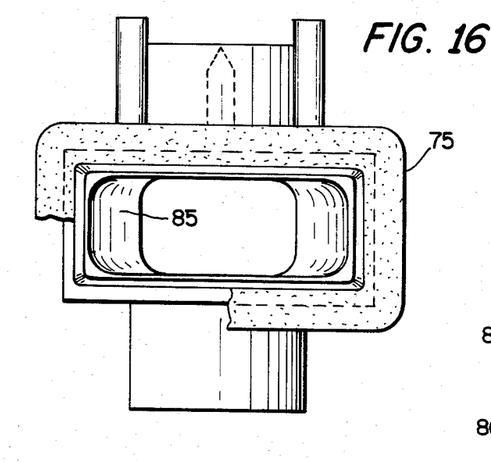
FIG. 16 is a front elevation of a valve housing and gasket, partly cut away, of the embodiment of FIGS. 14 and 15.

A still further embodiment in accordance with the invention is shown in FIGS. 14 and 15 in its assembled form, this embodiment having the distinct advantages of greater simplicity and superior non-leakage qualities. As shown therein, the pipe indicated generally at 10 which has a rectangular opening therein receives a generally rectangular gasket 75 which, as will be seen in FIG. 16, has a generally rectangular outline and is provided with an annular recess extending entirely around the gasket, forming generally parallel flanges 76 and 77 which are larger than the opening in the pipe. The gasket also has a central opening 79 which receives the nose portion 81 of a valve housing indicated generally at 82, the nose portion having a chamfered end portion which snugly fits through the central opening 79 of the gasket.

Figure 17:
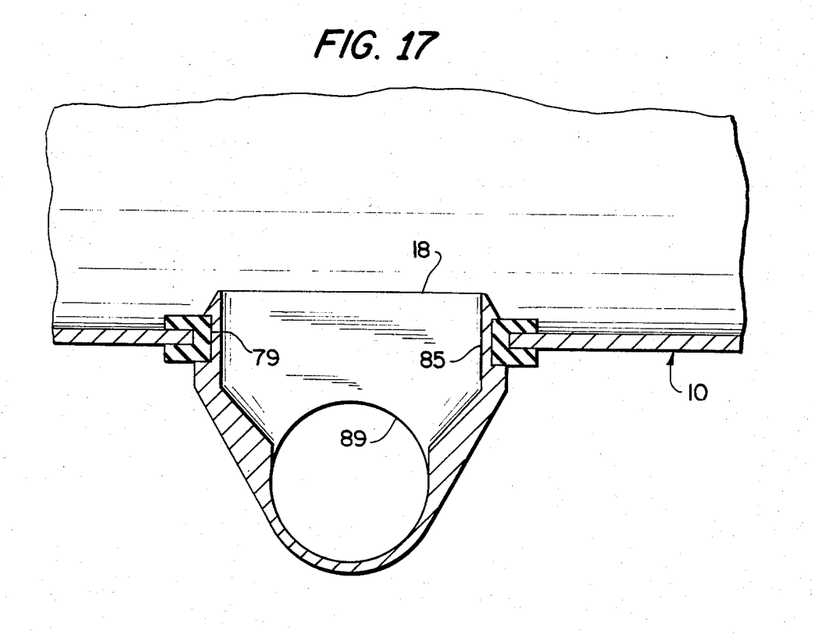
FIG. 17 is a sectional view along line 17—17 of FIG. 14 with the valve member removed.
Figure 18:
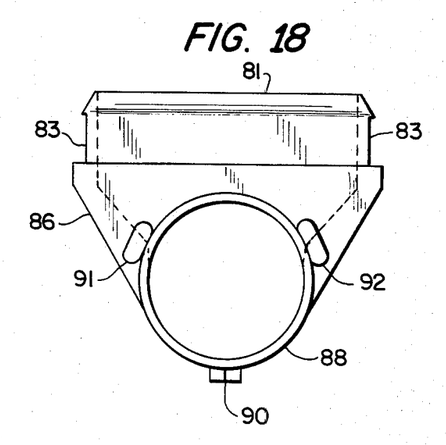
FIG. 18 is a top plan view of the valve housing of the embodiment of FIGS. 14 and 15.
Figure 19:
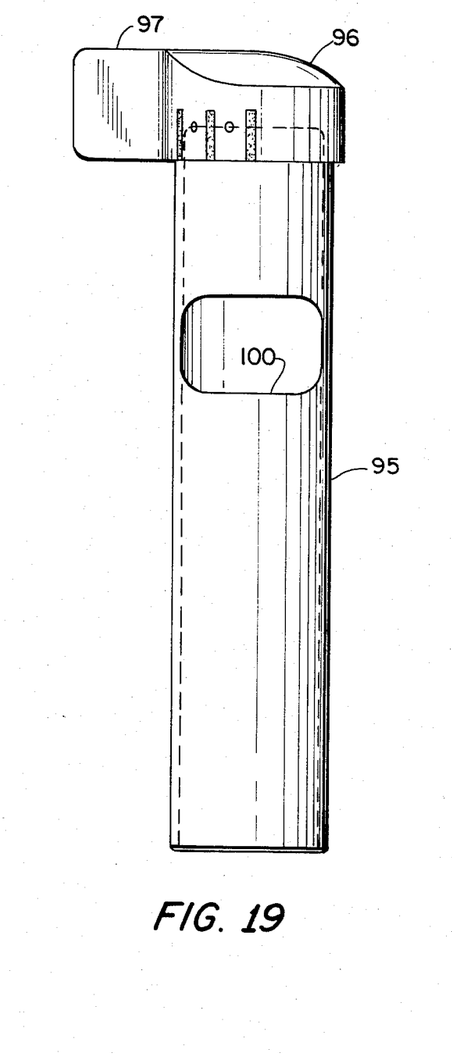
FIG. 19 is a side elevation of the valve member of the embodiment of FIGS. 14 and 15.

Nose portion 81 is more clearly seen in FIGS. 15, 17 and 18 from which it will be recognized that the upper and lower surfaces of the nose portion are substantially flat except for the chamfered end surfaces and the side portions are slightly recessed at 83 to form slight hooks at the inner end of the camfered portions to engage opening 79 in gasket 75. The overall exterior shape of the nose portion is rectangular, as is the interior opening 85 which, with this arrangement, is only slightly smaller in total cross sectional area than the opening in the pipe itself.

The nose portion is joined to and integrally formed with an intermediate section 86 which is tapered and merges smoothly into a tubular section 88 of housing 82. As will be seen in FIGS. 17 and 18, opening 85 also tapers inwardly to the outer diameter of an interior bore 89 within tubular portion 88. The tubular portion extends for a short distance above and below intermediate section 86, the portion above the intermediate section having a pointer 90 and first and second stop members 91 and 92.

The interior bore 89 of tubular portion 88 is dimensioned to snugly receive the tubular portion 95 of a valve member which has a cap 96 with a protruding wing 97. As will be recognized from FIG. 14, wing 97 can be rotated in both directions from pointer 90 within the limits defined by stops 91, 92, an angular swing of approximately 200°. Calibrations 98 can be provided on both sides of wing 97 for cooperation with pointer 90 to indicate the position of the valve. Numerals can also be placed around the top surface of the cap, generally aligned with calibrations 98, for further informational display.

Figure 8:
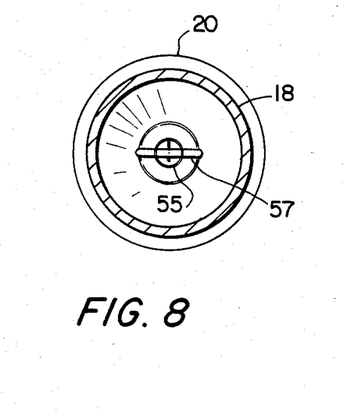
FIG. 8 is a transverse sectional view along line 8—8 in FIG. 7.

Tubular valve member 95 is provided with an opening 100 which, when aligned with opening 85 in the valve housing, permits the free flow of water from the interior of pipe 10 to the lower end of valve member 95 and out of that end. The lower end of the valve member is normally open, although it can be closed by a ball valve arrangement as described in connection with FIGS. 7 and 8. Total misalignment of openings 100 and 85 prevents water flow, while intermediate positions of partial alignment permit varying rates of flow, as with the previously described valve.

Installation of the assembly in accordance with FIGS. 14–19 is particularly simple and requires, first the installation of gasket 75 in the opening. This is followed by placing a small quantity of grease on the exterior chamfered portion of nose 81, after which the nose portion can be pushed through the gasket until the gasket fits within recesses 83, completing the installation of the housing. The valve member, if not previously installed in the housing, can then be inserted, and the valve is ready to be adjusted and used.

Figure 20:
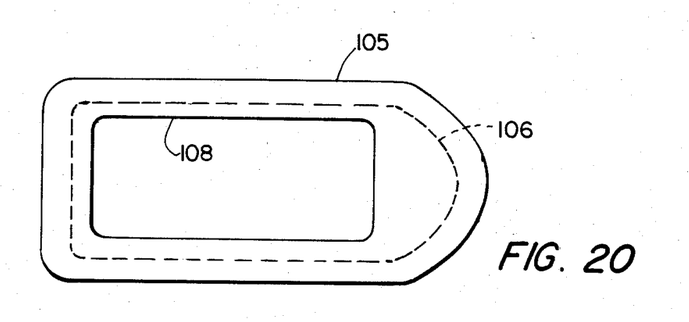
FIG. 20 is a front elevation of an alternative form of gasket usable with the embodiment of FIGS. 14 and 15.

FIG. 20 illustrates that various forms of gaskets can be used, depending upon the size and shape of the opening. Gasket 105 shown in FIG. 20 is for use with a particular type of gate opening which has a generally rectangular shape but with one end elongated and rounded, generally conforming to the shape of the exterior annular recess 106 of the gasket. The opening 108, however, remains the same size and shape as opening 79 in gasket 75 to receive the nose portion of the same valve housing as described above.

While certain advantageous embodiments have been chosen to illustrate the invention, it will be understood by those skilled in the art that various changes and modifications can be made therein without departing from the scope of the invention as defined in the appended claims.

What is claimed is:

1. A valve assembly for regulating the flow of liquid through an opening in the side of a generally horizontal pipe comprising
   an elastomeric gasket insertable into the opening in the pipe, said gasket having flange portions inside and outside of the pipe in its mounted position and having a central generally rectangular opening alignable with the opening through the pipe for receiving a valve housing;
   a generally T-shaped valve housing having a hollow protruding portion shaped to extend into and engage said central opening in said gasket, the cross arms of said housing comprising a hollow, tubular member open at both ends,
   said gasket and housing being mountable in the pipe opening such that said arms of said housing lie in a generally vertical plane with one arm higher than the other; and
   a tubular, hollow valve member slidably received in the arms of said housing,
   said valve member having an enlarged portion at the higher end to limit the insertion of said member into said housing, and
   means defining a flow opening through the side wall thereof, said opening being axially spaced from said enlarged portion so as to lie in the same plane as said hollow protruding portion of said housing,
   said valve member being selectively rotatable to a plurality of positions in which the opening in said valve member is completely aligned, partially aligned and totally non-aligned with the hollow interior of said protruding portion and the opening in said pipe to thereby select the size of passage available for liquid flow.

2. A valve according to claim 1 wherein said valve member further includes a radially projecting arm at said enlarged end by which said valve can be rotated.

3. A valve according to claim 2 wherein said valve housing includes a pointer adjacent the upper end of one of said arms,
   and said enlarged end of said valve member includes indicia arranged adjacent said pointer to indicate the position of said flow opening in said valve member.

4. A valve according to claim 2 wherein said valve member further includes
   a ball having a diameter larger than the inner diameter of said valve member;
   an extension spring having one end connected to said ball; and
   anchor means at said enlarged end connected to the other end of said spring, the length of said spring being chosen to lightly hold said ball against the open, lower end of said valve member.

5. A valve according to claim 1 wherein said valve housing includes a pointer adjacent the upper end of said arms,
   and said enlarged end of said valve member includes indicia arranged adjacent said pointer to indicate the position of said flow opening in said valve member.

6. A valve according to claim 1 wherein said hollow protruding portion includes a nose section insertable through said gasket and an enlarged rectangular shoulder limiting the insertion;
   said nose portion having a chamfered end surface and recesses at opposite sides thereof for engaging said gasket.

7. A valve according to claim 6 wherein said protruding portion further includes a tapered external surface between said shoulder and said tubular member.

8. A valve for regulating the flow of liquid through an opening in the side of a generally horizontal pipe comprising
   a mounting adapter insertable through the opening in the pipe, said adapter having a portion outside of the pipe in its mounted position for receiving a valve housing and having a central opening alignable with the opening through the pipe;
   a generally T-shaped valve housing having a hollow leg with means thereon for engaging said adapter, the cross arms of said housing comprising a hollow, tubular member open at both ends,
   said adapter and housing being mountable in the pipe opening such that said arms of said housing lie in a generally vertical plane with one arm higher than the other; and
   a tubular, hollow valve member slidably received in the arms of said housing,
   said valve member having an enlarged portion at the higher end to limit the insertion of said member into said housing, and
   means defining a flow opening through the side wall thereof, said opening being axially spaced from said enlarged portion so as to lie in the same plane as said hollow protruding portion of said leg, said valve member being selectively rotatable to a plurality of positions in which the opening in said valve member is completely aligned, partially aligned and totally non-aligned with said hollow leg and the opening in said pipe to thereby select the size of passage available for liquid flow.

9. A valve according to claim 8 wherein said valve member further includes a radially projecting arm at said enlarged end by which said valve can be rotated.

10. A valve according to claim 9 wherein said pipe opening is rectangular and said mounting adapter includes a plate having a curvature approximating that of the pipe interior adjacent the opening;

a generally rectangular gasket adjacent said plate;

a central opening; and first and second generally L-shaped arms protruding from said plate and extending toward each other to form, with said plate, a generally C-shaped opening;

and wherein said means on said housing for engaging said adapter includes a radially extending flange receivable between said legs, said flange having cam surfaces to engage the portions of said legs extending toward each other.

11. A valve according to claim 10 wherein said plate and legs of said adapter are dimensioned such that said plate and gasket are insertable through the pipe opening from the outside and rotatable until said legs lie against the shorter sides of the pipe opening, whereby said housing can be mounted on the pipe without access to the pipe interior.

12. A valve according to claim 11 and further including a second gasket between said valve housing leg and the exterior surface of said pipe.

13. A valve according to claim 9 wherein said valve housing includes a pointer adjacent the upper end of said arms, and said enlarged end of said valve member includes indicia arranged adjacent said pointer to indicate the position of said flow opening in said valve member.

14. A valve according to claim 13 wherein said flow opening is non-symmetrical relative to any axial line passing therethrough and tapers from one side to the other.

15. A valve according to claim 9 wherein said valve member further includes a ball having a diameter larger than the inner diameter of said valve member;

an extension spring having one end connected to said ball; and anchor means at said enlarged end connected to the other end of said spring, the length of said spring being chosen to lightly hold said ball against the open, lower end of said valve member.

16. A valve according to claim 8 wherein said valve housing includes a pointer adjacent the upper end of said arms, and said enlarged end of said valve member includes indicia arranged adjacent said pointer to indicate the position of said flow opening in said valve member.

17. A valve according to claim 16 wherein said flow opening is non-symmetrical relative to any axial line passing therethrough and tapers from one side to the other.

* * * * *